United States Patent [19]
Ström

[11] Patent Number: 5,893,302
[45] Date of Patent: Apr. 13, 1999

[54] STRIPPER FOR FIBER RIBBON

[75] Inventor: Joakim Ström, Hägersten, Sweden

[73] Assignee: Telefonaktiebolaget LM Ericsson, Stockholm, Sweden

[21] Appl. No.: 08/721,021

[22] Filed: Sep. 26, 1996

[30] Foreign Application Priority Data

Sep. 27, 1995 [SE] Sweden ................................. 9503338

[51] Int. Cl.$^6$ ..................................................... H02G 1/12
[52] U.S. Cl. ............................................. 81/9.51; 81/9.41
[58] Field of Search ........................... 81/9.51, 9.41, 81/9.4

[56] References Cited

U.S. PATENT DOCUMENTS

| | | | |
|---|---|---|---|
| 3,363,309 | 1/1968 | Logan et al. | 81/9.51 X |
| 3,657,795 | 4/1972 | Mackay | 81/9.51 X |
| 3,895,426 | 7/1975 | Papsdorf | 81/9.51 X |
| 4,188,841 | 2/1980 | Nakamura et al. | |
| 4,870,878 | 10/1989 | Butler et al. | |
| 5,269,206 | 12/1993 | Yagawa | |
| 5,441,397 | 8/1995 | Eriksen et al. | |
| 5,570,446 | 10/1996 | Zheng et al. | |
| 5,572,313 | 11/1996 | Zheng et al. | |
| 5,586,211 | 12/1996 | Dumitrou et al. | |

FOREIGN PATENT DOCUMENTS

| | | |
|---|---|---|
| 4038414 | 6/1992 | Germany . |
| 54-88137 | 7/1979 | Japan . |
| 9103492 | 11/1991 | Sweden . |

*Primary Examiner*—D. S. Meislin
*Attorney, Agent, or Firm*—Burns, Doane, Swecker & Mathis, L.L.P.

[57] ABSTRACT

For removal of the protective coating of cables, in particular optical 12-fiber ribbons and other optical multi-fiber ribbons, a tool has several movable segments that each remove a portion of the coating. Each of the segments has a pair of blades positioned in opposition to cut into the cable coating from opposite sides, dividing the coating to be stripped into small pieces. The segments are moved longitudinally along the cable to strip the cut coating. The segments are linked together for a chain-reaction type movement, that is, movement of any one segment begins only when the preceding segment has moved a set distance. Thus, in a single operation, the coating is stripped in small pieces, and the force applied to the tool operates sequentially on small pieces cut by each segment, which lowers the force needed to be applied to the tool.

18 Claims, 4 Drawing Sheets

5,893,302

1

STRIPPER FOR FIBER RIBBON

BACKGROUND

The invention relate a method and a tool for stripping a cable, in particular a fiber ribbon cable.

A fiber ribbon comprises several optical fibers held together, for example, by a polymer jacket or sleeve. The fibers are located adjacent to each other, isolated from each other and from the environment, and are fixed in parallel to each other. The number of fibers that are located in parallel is of course optional. Commercially in, for instance, Sweden fiber ribbons having four parallel fibers, 4-fiber ribbons, are used, while in the U.S. 12-fiber ribbons are used. Also 6- and 8-fiber ribbons are today commercially available.

In splicing two different fibers, which usually is performed by fusioning or welding, the primary protective coating must first be removed. That is, both the individual protective coating of the fibers and the material that keeps the fibers together as a fiber ribbon, must be stripped. Thereupon the uncovered fibers are cut to then be welded to each other.

In order to strip the primary protective coating, the entire fiber ribbon is first heated, by for example, a fiber tool such as the tool described in Swedish patent application 9103492-6, filed Nov. 11, 1991. Heating is performed to soften the primary coating of the fiber ribbon, which in turn reduces the friction forces holding the coating to the fibers, thus facilitating the stripping operation. After heating, the primary protective coating is cut into by two blades having opposed edges, which pinch the long sides of the fiber ribbon about 35–50 mm from the end thereof, which is the length that usually must be removed. Then one pulls the fiber ribbon with two possible outcomes:

1. The primary protective coating is pulled away in the shape of a long thin plastic tube.
2. The primary protective coating is scraped away as small particles.

The first of these two cases is the desirable one, because the second case results in many small particles which contaminate the stripping tool and work area requiring cleaning. Furthermore, the stripped fiber ends also become dirty, and then they too must be cleansed. Further, if the heated fiber ribbon is made too soft, i.e. too much heat is supplied, the result will be that the fiber ribbon is easily deformed and the primary protective coating is torn to pieces, which is also an undesirable result.

It is not very difficult to strip a fiber ribbon having relatively few fibers joined to each other, for example the 4-fiber ribbons commonly used in Sweden. This is due to the fact that a relatively small force is required for removing the relatively small amount of primary protective coating from the optical fibers in the shape of a long thin tube. Tools for accomplishing this are thus commercially available today, for example "ECC4", manufactured by the company Ericsson Cables AB.

Another stripping tool for optical fibers is described in the U.S. Pat. No. 4,188,841 which discloses a stripping tool for a single optical fiber. The tool may comprise a number of serially arranged pairs of blades, which are fixed in relation to each other, having the purpose of avoiding a repeated stripping process when stripping long coatings of an optical fiber.

The German published patent application No. 40 38 414 relates to a stripper apparatus for optical fibers, in which two blade systems are included, by means of which an outer coating and both an outer and inner coating respectively are penetrated in the stripping operation. In this manner a stripped fiber end is obtained, where the inner coating sticks out outside the outer coating.

When stripping fiber ribbons having a larger number of fibers, for example 12-fiber ribbons, presently used in the U.S.A., it is not equally simple to pull off the primary coating in the shape of an unbroken tube piece. The primary protective coating must be removed using a much larger force than that required for a 4-fiber ribbon. The result, when a tool similar to the aforementioned ECC4 is used, is often that the primary coating is torn to pieces.

Another problem which can occur is that the remaining plastics matrix of the ribbon fiber is deformed, so that the stripped fibers begin to point in different directions, which hinders the subsequent cutting and welding to a significant extent. In order to avoid these problems the fiber ribbon can be stripped in several stages of about 8–10 mm at a time. As a result, the force required for removing the primary protective coating becomes smaller and the coating can be removed as short tube pieces. However, the work of performing successive stripping operations for each 8–10 mm becomes cumbersome, since the length to be stripped usually is between 35 and 50 mm.

SUMMARY

It is an object of the invention to provide a method and a device by which a cable, in particular optical fiber cables arranged to form a fiber ribbon, can be stripped without causing the above mentioned problems, and without requiring that the cable must be stripped several times or in several operations to achieve a sufficiently long stripped region.

The invention provides a device having a plurality of two-pieced segments, each segment comprising a topside or upper side having a blade and a bottom or lower side having an opposed blade. The segments are connected in series to be displaced in relation to each other like in an accordion. The segments thus do not begin movement simultaneously, but rather, each segment trails a preceding segment after a set delay. This allows a stripping of a large number of short pieces of the primary coating, in one single operation, without the risk of scraping the jacket or primary coating.

Hence, a general method of stripping a cable is provided, in particular an optical fiber cable and in particular optical fiber cables joined to a fiber ribbon. An optical fiber cable typically includes an inner longitudinal fiber core and at least one protective or isolating jacket enclosing the core. With the method according to the invention, the protective jacket is stripped automatically in a number of stages beginning at the end of the cable to be stripped, so that the stripped coating is removed in the shape of unbroken, short tube pieces. The entire stripping is carried out in one single operation, by first bringing at least two sets of opposed blade edges against the cable. The at least two sets of opposed blade cut into the cable at two locations space a longitudinal distance from each other and at a longitudinal distance from the end of the cable. Thereupon a force is applied to the blade edges in the longitudinal direction of the cable, towards its end, so that the force first acts on the first set of blade edges closest to or located directly at the cable end and displaces a first piece of the protective jacket a distance towards the end of the cable. Thereafter the force is applied to the next closest or proximate blade edges for displacing a second piece of protective jacket located adjacent the first piece toward the end of the cable. At the same time the first set of blade edges continue to displace the first piece of the protective jacket further away from the original position thereof, in a direction towards the end of the cable.

A tool for removing cable coatings, in particular optical fiber cables and in particular optical fiber cables joined to form fiber ribbons, has at least two-pairs of opposed blades with edges positioned transverse to the cable length, which can pinch the cable and cut into the protective jacket to form cuts or notches perpendicular to the longitudinal direction of the cable. These blade pairs are located on different segments, which are moveable or displaceable in relation to each other. The tool also has a retaining means for retaining the end of the cable, so that it does not move when the cable is stripped. The retaining means may comprise a standard fiber retainer, such as that provided in the Ericsson Cables ECC 4 stripper, mentioned above, which in a suitable manner can be fixed to the tool.

The segments of the tool are suitably moveably mounted on shafts, which permit the segments to move only in relation to each other in the longitudinal direction of the cable. Moreover, these segments are advantageously provided with hooks or abutments, which link the segments together to control relative displacement between adjacent segments.

Furthermore, the tool can comprise electrical coils, which then are preferably mounted in the segments, for heating a cable to be stripped. The heat provided from these coils can then be controlled automatically to any predetermined temperature based on the output signal from one or several temperature sensing means such as suitable transducers.

The tool may also comprise a stop to prevent pieces of the stripped protective jacket from being entirely removed from the end of the cable. In other words the stripped pieces are prevented by the stop, among other things, from moving more than predetermined distances from their initial positions. The stop acts advantageously on the outermost segment located at the outermost end of the cable.

Each of the segments includes two mating parts that can be closed around a cable. The mating parts advantageously include both male and female parts which come into engagement with each other as the segment parts are brought together in order to lock the segment parts to each other. The connected segment parts thus form one unit that can be moved in a direction parallel to the axes of the tool and thus in parallel to the longitudinal direction of a cable correctly placed in the tool. Furthermore, a recess may be located in the middle portion of each of the parts. When the parts are closed on a cable, the recesses are aligned and provide a walled cavity to contact the outer surface of a cable for lateral alignment of the cable. The tool further advantageously comprises a large top or upper part, on which the outermost upper segment part of each segment is mounted. This top part engages all the segments to provide a movable handle to be gripped by an operator to effect the stripping movement of the cutting blades.

In a practical embodiment the tool comprises a retainer block or main body in the shape of a suitable metal block having a side surface. A linear bearing extends or projects from this side surface, for example two straight parallel circular-cylindrical shafts. At least two segments are mounted for sliding on the shafts. The segments each carry a pair of blades, which in a stripping operation are applied to the surface of the protective jacket of a cable and thereby penetrates into the jacket. The segments are linked together for limited individual movement along the shafts in relation to each other. That is, each segment can move a limited distance toward the end of the cable before the adjacent segment begins to move. On the main body suitable means, for example, a clamp, are provided for retaining the cable.

A stop or abutment is attached to the linear bearing shafts at the outer end thereof.

The segments are linked together for chained sequential movement. Accordingly, a lead or outermost segment, which is arranged farthest away from the main body, includes a hook or engagement means which is arranged to engage at least one other trailing segment to initiate movement of the trailing segment only when the lead segment, at which the means is mounted, has been displaced a predetermined distance from the other segment. These distances are different for each of the succeeding segments, that is, before each succeeding segment is engaged, the lead segment moves an additional distance away from the main body and accordingly toward the end of the cable.

BRIEF DESCRIPTION OF THE DRAWINGS

The invention will now be described by way of an non-limiting exemplary embodiment with reference to the accompanying drawings, in which.

DETAILED DESCRIPTION

Figure 1:
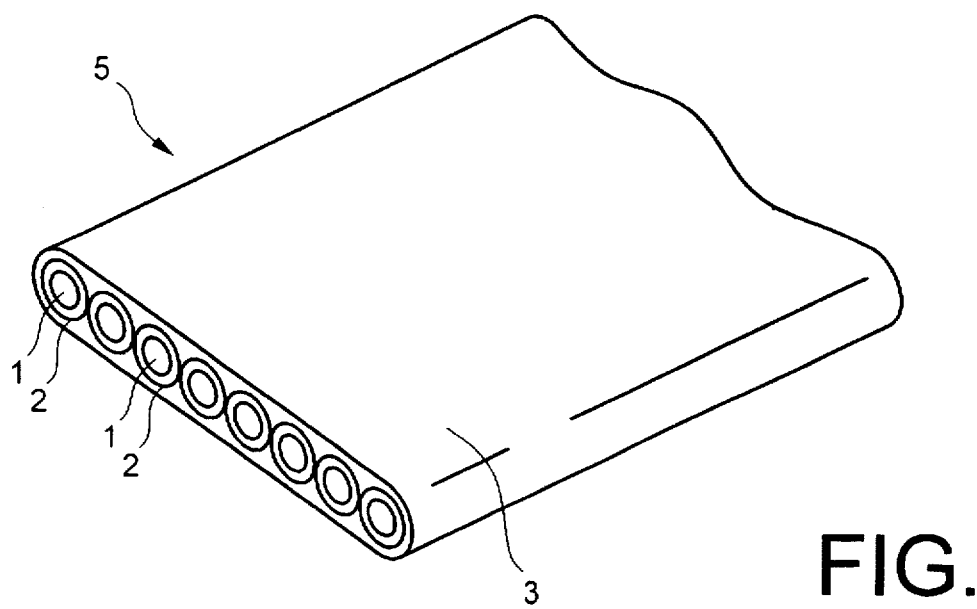
FIG. 1 is a perspective view showing the structure of a ribbon fiber.

In FIG. 1 the structure of a fiber ribbon 5 is shown in section. The fiber ribbon 5 comprises a plurality of individual, parallel, optical fibers 1. Each of these individual fibers is covered with a protective coating 2 of a suitable material, for example a polymer material. A number of such fibers, i.e. optical fibers 1 covered with a coating 2, are grouped to form an optical cable 4, and are then joined to each other by means of a common protective jacket 3 to form the fiber ribbon 5.

In various applications, e.g. in splicing a fiber ribbon to another ribbon cable or individual optical fibers, it is necessary to uncover or expose the bare optical fibers. Thus, the different jackets 3 or coatings 2 of polymer materials, jointly denoted the primary protective coating or primary coating, must be removed. This is performed according to the invention in a number of different stages but in-one single operation by means of a tool, which is schematically shown in FIGS. 2a–2e and in FIGS. 3a–3b, which show a detail used in the device illustrated in FIGS. 2a–2e.

Figure 2A:
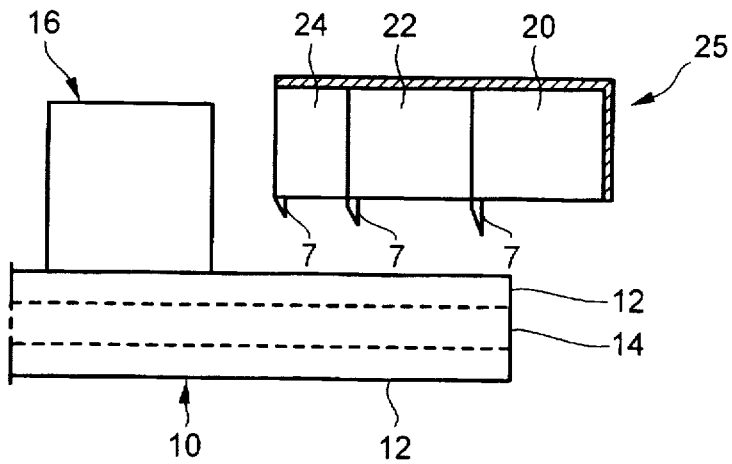
FIGS. 2a–2e are schematic side views showing in sequence different steps of a method of stripping a ribbon fiber in accordance with the invention.
Figure 2B:
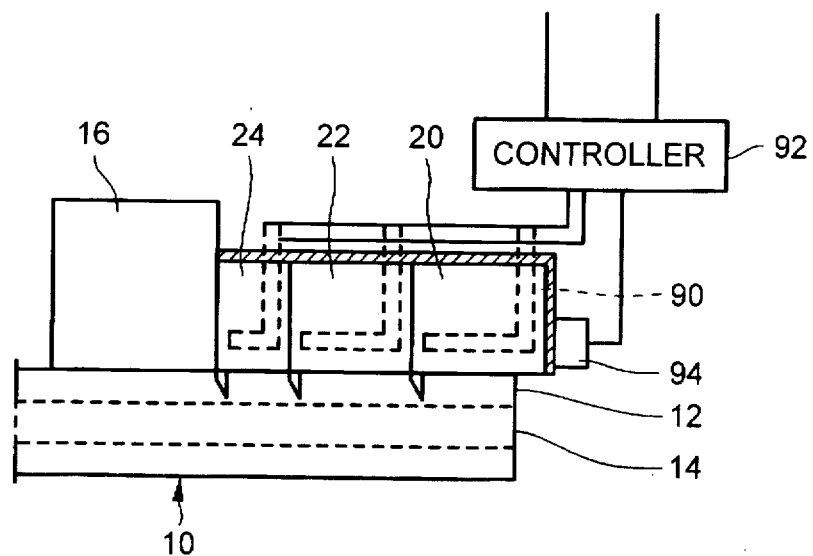

The illustrated tool includes a plurality of segments 20, 22, and 24 forming a movable cutter 25, each segment comprising a pair of mating upper and lower parts. In FIGS. 2a–2e, only the upper part of each segments is shown. Each segment is designed to have the same function as a conventional stripping tool. Thus each segment has a pair of blades 7, one blade mounted in each of the upper and lower parts, the blades being positioned with opposing edges. The blade edges are oriented along the transverse direction in relation to the longitudinal direction of the fiber ribbon. When the segment parts are closed around a fiber ribbon, the opposed blade edges in the upper and lower parts pinch the fiber ribbon from both the upper and lower sides and then cut into the primary coating 12 from the top side as shown in FIG. 2b. Although not shown, the bottom blade cuts into the primary coating from the bottom side in an identical manner. These segments 20, 22, and 24 are mechanically interconnected in a suitable manner, so that the segments are displaceable for limited movement in relation to an immediately trailing segment, so that a leading segment moves a set distance before the trailing segment begins to move.

Figure 3A:
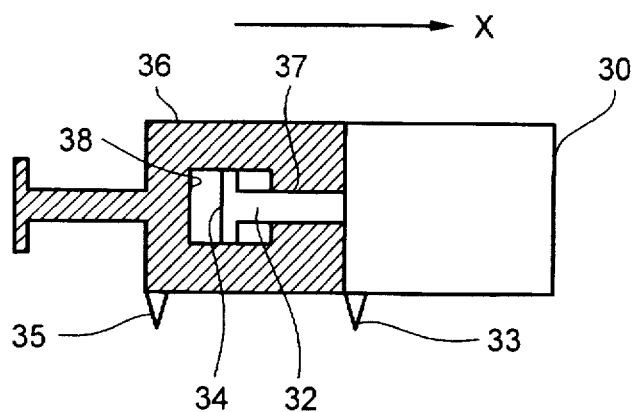
FIGS. 3a and 3b are schematic views showing how different blade-carrying segments of a stripping mechanism can be joined to each other for chain movement.
Figure 3B:
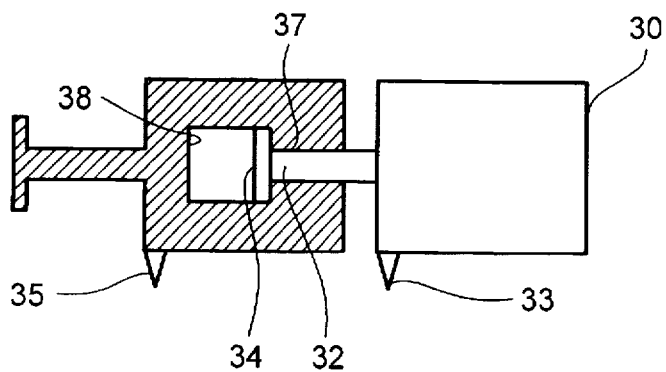

One such a possible interconnection is shown in FIGS. 3a–3b. The interconnection device comprises in this case a restraining bar 32 attached to a first or lead segment 30, so that the longitudinal direction of the bar is essentially parallel to the direction of movement X of the segment, and, accordingly, perpendicular to the edge of the blade 33 of the segment 30. A head 34 is formed at the end of the bar 32 remote from the lead segment 30. A next in line segment 36 has a hole 37, which extends essentially perpendicularly to the edge of the knife 35 of this segment 36 and leading to an internal cavity 38. The hole diameter sized to receive the bar 32 and the head 34 is positioned in the cavity 38. The bar 32 allows the lead segment 30 to move linearly a distance corresponding to a length of the bar 32 in the cavity 38 before the head 34 engages the inside of the cavity in the trailing segment 36. Thus, the segments 30, 36 are displaceable a limited amount in relation to each other in a direction essentially perpendicular to the edges of their respective blades 33 and 35.

In the embodiment shown in FIGS. 3a–3b, the cavity 38 has a larger diameter than the hole 37, which prevents the head 34 from passing through the hole. In addition, the cavity 38 has a longitudinal dimension to allow movement of the head 34 inside the trailing segment 36.

In this manner two segments are provided, which are displaceable a limited distance in relation to each other, and subsequently simultaneously displaceable, in a direction which is essentially perpendicular to the planes in which the two blades of the segments are located. Further, the segments are so interconnected, that they cannot be pulled apart. The trailing segment 36 also has a bar with a head that can be mounted to an additional trailing segment (not shown) so that movement of the trailing segment 36 past a distance corresponding to the bar length initiates movement of the additional trailing segment. Accordingly, a chain of such segments of any desired length can be formed.

Depending on a desired length for each of the sections of ribbon to be stripped, which is usually the longest length that can be stripped in the shape of a tube, a suitable number of segments having a suitable length between adjacent blade pairs are interconnected in this manner. In the case where the fiber ribbon to be stripped is a 12-fiber ribbon a suitable length of each segment is about 8–12 mm, which means that in order to strip a piece having a length of 48 mm some five segments that are serially connected in the chained manner described above are required.

The method for performing a stripping operation by means of such apparatus is schematically illustrated in FIGS. 2a–2e. In these figures only the operation applied to the top side of the fiber ribbon is shown, but the same procedure also takes place on the bottom side of the fiber ribbon, since the tool is symmetrical in its function. Furthermore, the schematic FIGS. 2a–2e only show three interconnected segments, but of course more segments may be provided as will be discussed hereinafter.

Figure 2C:
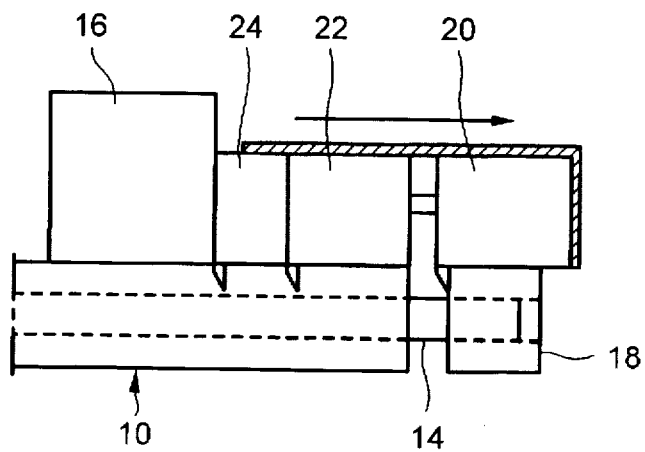
Figure 2D:
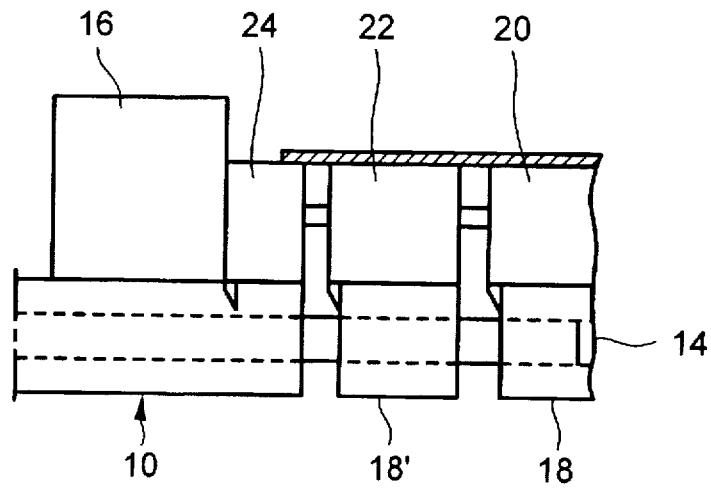
Figure 2E:
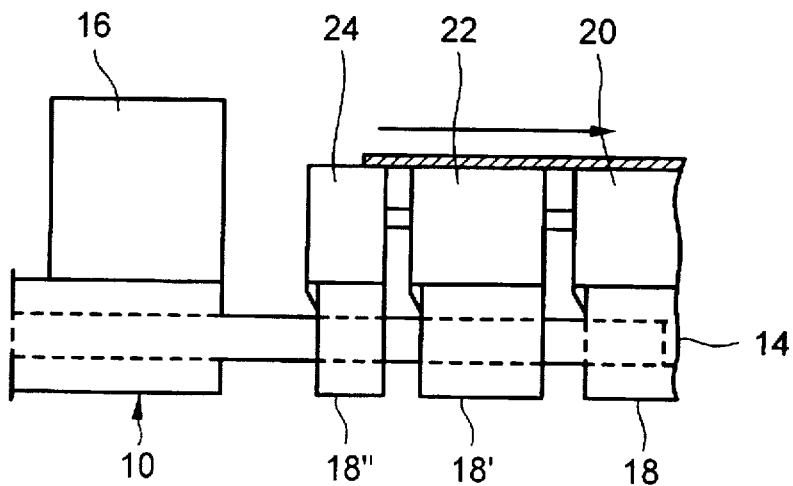

First the fiber ribbon end 10 to be stripped is fixed with a suitable length of ribbon measured from its end surface, for example 35–50 mm from the end surface, in position for stripping. The ribbon end 10 is held by a retainer means 16, see FIG. 2a, which clamps the fiber ribbon and thus holds it firmly. This retainer means 16 is preferably integrated with the stripping tool itself, but can also be an individual part, separate therefrom. Any suitable clamping device as known in the art for holding fiber ribbons, for example the clamp in the Ericsson Cable ECC 4 can be used, and the particular clamp not forming a part of this invention. Thereafter the stripping tool together with its segments is positioned so that the edge of the blade 7 on the innermost segment 24 (the segment farthest from the free end of ribbon end 10) begins to pinch the point on the fiber ribbon 10, from which a stripping is desired, see FIG. 2b. The other segments are then closed together to pinch the fiber ribbon. When the segments in this manner pinch the fiber ribbon, so that all of their blades have penetrated into the primary coating 12 of the fiber ribbon 10, a longitudinally directed force is applied to the outermost or lead segment 20 (the segment closest to the ribbon free end) in a direction away from the retainer means 16, this force being perpendicular to the planes in which the blades are located and thus being parallel to the longitudinal direction of the fibers, see 2c. As seen in FIG. 2c, the outermost segment 20 moves longitudinally away from the ribbon end 10. This results in a portion of the primary coating 12 closest or most proximate to the end of the fiber ribbon being stripped as an unbroken tube 18. When the lead segment 20 reaches the end of the restraining bar (see FIGS. 3a and 3b), the next segment 22 in the chain begins to move, as seen in FIG. 2d. This segment 22 strips another small part 18' of the coating. When the second segment 22 reaches the end of its restraining bar, the next in line segment 24 begins to move, and removes another piece of the coating 18", as shown in FIG. 2e.

Figure 4:
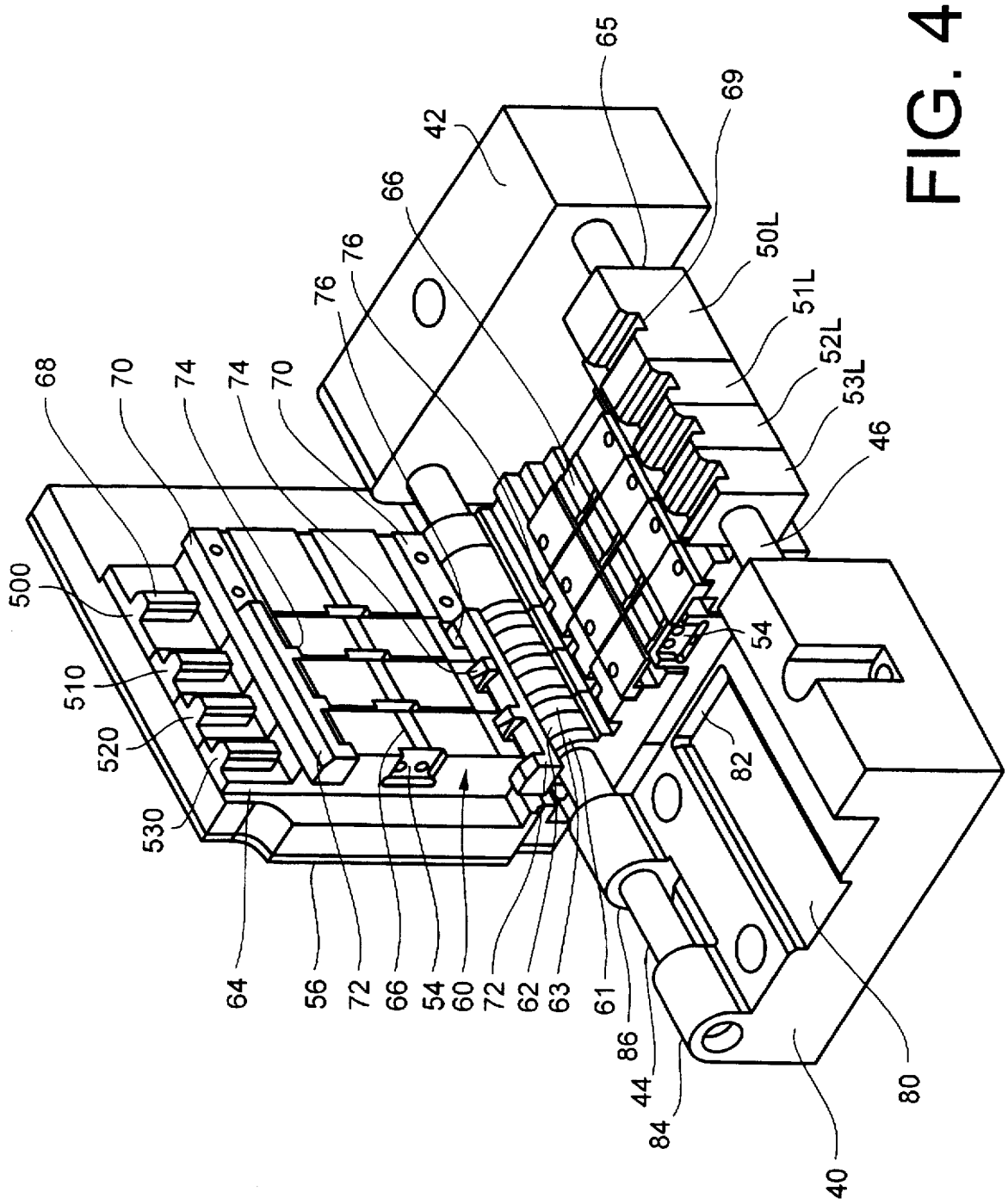
FIG. 4 is a perspective view showing an apparatus in accordance with the invention for stripping a fiber ribbon.

FIG. 4 shows a stripping tool constructed according to the principles described with reference to FIGS. 1–3b. Thus, the tool shown in FIG. 4 has the same functional elements as the tool described with reference to FIGS. 2a–2e, but in some regards has a different design.

The tool of FIG. 4 includes a retainer block 40 and an end block 42 that support two parallel shafts 44, 46. The cutting tool elements are mounted for sliding on the shafts 44, 46 between the retainer block 40 and the end block 42. The cutting elements consist of upper segments 50U to 53U that are mounted to the shaft 44 for sliding in cooperation with a lid 56, described in more detail below. Lower segments 50L to 53L are mounted for sliding on both shafts 44 and 46, and cooperate with the upper segments 50U–53U for cutting and removing coating from the cable.

The upper segments 50U–53U shown in FIG. 4 correspond to the segments 20, 22 and 24 shown in FIGS. 2a–2e, the outermost upper segment 20 in FIG. 2c corresponding to the lead segment 50U in FIG. 4. Furthermore, in FIG. 4 the bottom part of the stripping tool is shown, and this bottom part comprises lower segments 50L–53L opposed to the upper segments 50U–53U of the upper part. Each of these upper and lower segments are, like the segments in FIG. 2a–2e, provided with a blade, which is not shown in the figure but is intended to be mounted in recesses 54 formed in a side surface of the segments by means of screws. The recesses 54 in the segments 53U and 53L being most easily seen in FIG. 4.

The top part or lid 56 of the tool consists of a plate-shaped body which fixed to the lead segment 50U. The upper segments 50U–53U are each transversely elongated elements extending from the shaft 44 toward the shaft 46. Each segment 50U–53U includes a center body 60 which carries a blade in recess 54, and which receives the fiber ribbon for cutting and removing the coating. The segments 50U–53U also include an eyehole ring 62 at one end of the body, and a locking arm 64 at an opposite end of the body. The upper segments are mounted by their respective eyehole rings 62 for sliding on the shaft 44, and have limited movement in relation to each other along the shaft 44.

Hooking means 70, described in more detail below, is attached to the lid 56 and extends longitudinally on opposite sides of the center body portions 60 of the segments 50U–53U. The hooking means 70 is rigidly attached only to the lead upper segment 50U. The hooking means 70 support the trailing upper segments 51U–53U, which are not rigidly attached to the lid 56 of the tool, and maintain the trailing segments in alignment with the lead segment 50U. The hooking means 70 also control the relative movement of the segments. The lid 56 and all segments 50U–53U are pivotable as a unit about the shaft 44 to open and close the cutting tool.

As mentioned, the lead segment 50U is fixed to the lid 56 so that the lead segment is movable along the shaft 44 by moving the lid 56. The sequential chaining movement of the trailing segments for the stripping operation is obtained by the hooking means explained below.

The center body portions 60 of the segments include shallow recesses or grooves 66 to receive the fiber ribbon. The grooves 66 have vertical side surfaces that are suitably laterally spaced for retaining a fiber ribbon to be stripped in proper alignment in a lateral direction, i.e. maintaining the fiber ribbon in an essentially straight state.

The locking arms 64 on each of the upper segments 50U–53U are provided with a male part or tab 68. The tabs 68 project perpendicularly from the under side of the lid 56. When the lid 56 of the tool is in its swung-down closed position, the male parts 68 engage with corresponding female parts or slots 69 located at the transverse ends of the lower segments 50L–53L. In this position the segments of each pair will then be locked to each other at the front side.

The lower segments 50L to 53L in the bottom or lower part of the tool are similar to the upper segments 50U–53U, except that the lower segments lack hooking means 70 and that the locking arms 65 of the lower segments are equipped with the female parts 69 to engage the male parts 68 of the upper segments. The lower segments 50L–53L include two spaced rings 61, 63 that engage the shaft 44. The ring 62 of a corresponding upper segment 50U–53U is mounted to the shaft 44 between the spaced rings 61, 63 of the lower segment. The interlaced rings and the engaged locking means 68, 69, ensure that the corresponding upper and lower segments move together as a unit. Furthermore, as mentioned, the lower segments are mounted for sliding along the shaft 44 and also along shaft 46, the locking arms 65 of the lower segments having through-holes for the shaft 46.

The hooking means 70 engages both the upper trailing segments 51U–53U and the lower trailing segments 51L–53L to control chained sliding movement of the segments. The hooking means 70 includes two hooking bars 72 that are attached to opposite lateral edges of the underside of the lead segment 50U. The hooking bars 72 extend longitudinally from the outermost segment 50U in a direction parallel to a fiber ribbon placed in the tool. The hooking bars 72 engage and support the upper trailing segments, holding them against the lid 56, but allowing sliding movement relative to the lid.

The hooking bars 72 each include a plurality of pins or protrusions 74 projecting from the main bar part in a transverse direction toward a center of the tool. The trailing segments 51U–53U rest on the main bar of the hooking means 70, with the pins 74 disposed in recesses 76 in the sides of the trailing segments. When the lid 56 is closed, the projections 74 come into engagement with recesses 76 in the lower segments except the lead one 50L. Furthermore, the projecting ridges 74 of the hooking bars 72 are longitudinally spaced in relation to the engagement side of recesses 76. These recesses 76 thus correspond to the projections 74 and are located in the side surfaces of all but the outermost segments. The recesses 76 have a substantially larger longitudinal extension than the projections 74 to allow some longitudinal movement of the projections before engagement with suitably located engagement surfaces. These engagement surfaces will come in contact with the projections 74 serially, that is, one after the other in a chain like manner, as described in connection with FIGS. 3a and 3b, above. Thus, the second outermost upper 51U and lower 51L segments do not become engaged until the lead upper 50U and lower 50L segments have been displaced a predetermined distance, for example 10 mm, from their initial position. Further, the subsequent segments will not become engaged until the neighbouring preceding pair of segments has been moved a predetermined distance from its initial position, etc.

The upper segments 50U–53U and lower segments 50L–53L are thus interconnected along the shaft 44 and are moveable along this common shaft. Furthermore, the lower segments 50L–53L are also attached to, but moveable along, the second shaft 46 located at the opposite side of the tool.

The tool also comprises a retainer part for a fiber ribbon placed therein, which has a lower part 40, the lid or upper part of which not being shown. The lower part 40 is designed as an approximately rectangular block having a recess 80 on its upper surface, which is intended, for example, to accept a standard detachable retainer for a fiber ribbon, which is conventionally used both for stripping, cutting and welding. An end wall 82 of the recess provides a retainer placed therein an abutment adjacent to the movable segments. The shaft 44 is rigidly attached to the retainer block 40 by two upstanding projecting parts 84, 86, so that a part of the shaft is exposed there inbetween. A lid part of the retainer, not shown, can be attached thereto for pivoting movement about the shaft 44 and to be swung down for holding a fiber ribbon.

The tool works in the following way. First the tool is placed in an initial position, by moving all upper segments 50U–53U and lower segments 50L–53L as far as possible in a direction towards the retaining block 40, until the end trailing segments 53U and 53L come into contact therewith. All segments are now in close contact with each other. This movement can be performed with a swung-down lid part 56 by pulling it manually in said direction. The lid 56 together with its connected parts is then swung up to open the tool to receive a fiber ribbon. A fiber ribbon, which is to be stripped, is fixed in the retainer with its end, which is desired to be stripped, positioned in the grooves 66 in the lower segments 50L–50L. Then the lid 56 of the tool, which is rotatable about the rear shaft 56, is again swung down, so that the male parts 68 of the upper segments 50U to 53U come into engagement with the female parts 69 of the lower segments 50L–53L. Each paired upper segment and opposite lower segment will then form a locked pair of segments that can move as unit. The locking function is provided by the complementary male 68 and female parts 69 at the front side and by the interengaged complementary rings 61, 62, 63 for the shaft 44 formed at the opposite end of the segments. The blades of the upper segments 50U–53U and lower segments 50L to 53L will then be located in opposition to each other and will with their edges cut into the primary coating of the fiber ribbon. Thereafter a force is applied to the lid 56 in the longitudinal direction of the fiber ribbon and toward the end block 42 and away from the retainer block 40. For applying the force, an operator can grip with his one hand the lid 56 and hold firmly the closed retainer part with his other hand.

This force results in that the lead segments, i.e. the upper outermost lead segment 50U and the corresponding lower lead segment 50L, are pulled away from the lower part 40 of the retainer, to the right in FIG. 4, for a limited distance before any other segment pairs begin to move. The desired result being that a first part of the primary coating is stripped from the fiber ribbon before any other parts of the coating are stripped. The remaining segments which now are connected to form locked pairs 51U, 51L; 52U, 52L; and 53U, 53L, still have their initial positions next to the lower part 40 of the retainer. If one then continues to apply the force, the hooking means 70 begins to move each of the trailing segments one at a time in sequential order, so that the subsequent parts of the primary protective coating will successively start to be pulled away from the fiber ribbon. Finally, after all projections of the hooking means are engaged, all paired and locked segments will be moving in a direction away from the lower part 40 of the retainer, which holds the fiber ribbon. Thereby the primary coating, which from the beginning was located between the outer end of the fiber ribbon and the blades of the innermost segment pair, will be stripped in short tube sections.

If the movement is continued long enough, all the parts of the primary coating stripped as short tubes will be entirely removed from the stripped end of the fiber ribbon, which in some cases is desirable. In other cases, such as in a subsequent cutting of the fibers, it can be desirable to keep one or more short tube pieces of the primary protective coating at the outermost end of the stripped fiber ribbon end, so that the individual fibers of the fiber ribbon are still joined to each other. This also results in that the risk that the operator, who carries out the cutting, will injure himself on the fiber remains will be minimized.

To control the movement of the cutting elements, the tool in FIG. 4 is equipped with the end or stop block 42 in the shape of an essentially rectangular plate attached to the ends of the parallel linear shafts 44, 46 at a suitable distance from the lower part 40 of the retainer, so that the segments are moveable along the shafts 44, 46 only between the retainer part 40 and the stop block 42. Because the stop block 42 limits the movement of the segments along the shafts, positioning the stop block 42 at a suitable distance from the retainer block can prevent the innermost stripped short pieces of the primary protective coating from being entirely removed from the fiber ribbon. The movement to the right in the figure is hence limited, when the side surfaces of the lead segments 50U, 50L come into contact with the opposing surface of the stop block 42. Furthermore, the stop block 42 is itself advantageously also displaceable along the shafts 44, 46 and can be fixed at a selected distance from the retainer 40, so that a desired amount of primary protective coating is left, after the stripping being finished, or so that the entire end of the fiber ribbon is completely stripped.

Furthermore, the tool can, in order to obtain a heating of the fiber ribbon to be stripped, be equipped with a heating device, not shown in FIG. 4, but shown schematically in FIG. 2b. In the tool shown in FIG. 4, a heating device can be arranged in the lower segments 50L–53L alone, and alternatively, a heating device can be mounted in both the upper and lower segments. The heating device is conveniently an electrical resistance heater having a heating wire or resistance wire disposed in the segments. In order to obtain a correct temperature, which can be different for different fibers, either an individual heat or temperature detector is provided for each segment or one common detector for all segments 50L–53L.

The output signal of this or these detectors is then used as an input signal to an automatic power controller, which controls the power supplied to the segments. Since different fibers have different optimal stripping temperatures, there is also a possibility to set a number of different predetermined temperatures. As shown in FIG. 2b, heating wires 90 are connected to a controller unit 92 through suitable lines. Also here, a temperature sensor 94 is attached to the outermost segment and it is electrically connected to the power controller 92.

In conclusion a method and a device have been described, which make it possible to easily in one operation strip a cable and in particular optical cables joined to each other to form a fiber ribbon, without risking that the coating will be scraped off. The method is primarily applied in stripping cables, where a piece, which is to be stripped in the shape of a tube, and which is so long that it is impossible to perform this in one single operation by means of conventional technique, in particular when stripping optical multi-fiber ribbons and in particular in stripping the 12-fiber ribbon commonly used in the U.S.A.

What is claimed is:

1. A method of stripping optical fiber cables joined to each other to form a fiber ribbon, the cable comprising at least one fiber inner core and at least one coating enclosing the core, the method comprising the steps of:

holding the cable firmly at a longitudinal distance from an end of the cable, applying transverse to the cable, at least two pairs of opposed cutting edges in to the coating of the cable at at least two longitudinally spaced locations and at different longitudinal distances from the end of the cable, applying a force to the pairs of opposed cutting edges in the longitudinal direction of the cable towards the end of the cable, so that the force first acts on and displaces a first pair of cutting edges located most proximate to the end of the cable for separating and displacing a first piece of coating a distance towards the end, and thereafter the force also acts on and displaces a next most proximate pair of opposed cutting edges for separating and displacing the coating located between the first and next most proximate pairs of cutting edges in a direction towards the end while continuing to apply the force to the first pair of opposed cutting edges to displace the first piece of coating, whereby the coating is removed in the shape of unbroken tubular pieces.

2. A method according to claim 1, comprising the further step of stopping the force and ceasing the displacement of the pieces of coating after the pieces of coating have moved predetermined distances, so that at least one piece of the coating is left on the stripped cable at a distance from its initial position.

3. A tool for removing coatings from optical fiber cables joined to each other to form a fiber ribbon, the tool comprising:

a retainer for holding a fiber ribbon in a fixed location, at least two segments, including a leading segment and at least one trailing segment, mounted to a frame for linear movement relative to the retainer, each segment including a cavity for enclosing a portion of an end of the fiber ribbon, linking means connecting the at least two segments, the linking means permitting linear movement of a first segment away from a trailing segment before engaging the trailing segment for movement, at least two pairs of blades having cutting edges, the blades being positioned to pinch the cable and so that the edges cut into the coating, wherein one pair of blades is mounted in each segment in opposition facing in the cavity, so that each of the at least two segments removes a subsection of coating.

4. A tool according to claim 3, further comprising means for heating the portions of the cable enclosed by the at least two segments.

5. A tool according to claim 4, wherein the heating means comprise electrical coils mounted in the at least two segments of the tool and a controller responsively connected to at least temperature sensing means mounted to sense the coils, so that heat emitted by the coils is automatically controlled to a predetermined temperature based on an output signal from the at least one temperature sensing means.

6. A tool according to claim 3, comprising a stop to prevent linear movement of the segments more than a set distance from the retainer, which prevents all subsections of the stripped coating from being entirely removed from the end of the cable.

7. A tool for removing coatings from optical fibers joined to each other to form a fiber ribbon, the tool comprising:

main body having a side surface, a linear bearing extending from the side surface, a retainer for holding an end portion of a fiber ribbon on the main body, at least two segments mounted for linear movement on the linear bearing, each of the at least two segments having a cavity to enclose a portion of the fiber ribbon, and each carrying blades, mounted in opposition to be applied to penetrate into the coating of a cable placed in the cavity, and linking means connecting the at least two segments, said linking means allowing relative movement between adjacent segments for a limited linear distance and simultaneous movement between adjacent segments beyond said limited linear distance.

8. A tool according to claim 7, wherein the linear bearing comprises parallel shafts extending from the side surface.

9. A tool according to claim 7, further comprising a stop attached to the linear bearing to limit linear movement of the at least two segments, said stop being selectively displaceable and securable at a selected position along the linear bearing, so that the segments are located between the main body and the stop.

10. A tool according to claim 8, wherein the at least two segments each comprise cooperating upper and lower parts, one of the parts is pivotably mounted to one shaft forming the linear bearing, whereby it is possible to separate the cooperating parts by rotating said one on the shaft.

11. A tool according to claim 10, wherein the cooperating parts include male and female parts to come into engagement with each other for locking the parts to each other.

12. A tool according to claim 7, wherein a segment which is positioned farthest away from the main body is a lead segment, and wherein said linking means is fixed to said leading segment and extends linearly for engagement with said at least one other segment.

13. A tool according to claim 7, wherein said linking means comprises an elongated element attached to the lead segment and extending in parallel to the linear bearing in a direction towards the main body, said elongated element carrying a plurality of spaced projections positioned to cooperate with engagement surfaces on the other segments, the projections being spaced so that a projection does not come into contact with an engagement surface until a preceding adjacent segment has been displaced a predetermined distance away from the main body.

14. A tool according to claim 12, wherein the segments each comprise upper and lower cooperating parts, and wherein said linking means is arranged on an upper part of said lead segment and extends linearly to support other upper part of trailing segments.

15. A tool according to claim 10, further comprising a plate attached to upper part of a lead segment, said plate being positioned said at least two segments.

16. A tool according to claim 7, further comprising heating means mounted in at least one of said at least two segments for heating a fiber ribbon disposed in the cavity in said segment.

17. A tool according to claim 16, wherein the heating means is connected to power controllers to control said heating means.

18. A tool according to claim 7, wherein the cavities in said at least two segments define side surfaces for aligning laterally a cable placed in the tool.

* * * * *